Aug. 18, 1959   F. E. MINDT ET AL   2,900,603
COMPENSATING UNIT FOR WATTHOUR METERS
Filed May 10, 1955

WITNESSES
Edwin E. Bander
David M. Schiller

INVENTORS
Frederick E. Mindt &
Warren J. Schmidt
BY C. L. Freedman
ATTORNEY

United States Patent Office 2,900,603
Patented Aug. 18, 1959

2,900,603

COMPENSATING UNIT FOR WATTHOUR METERS

Frederick E. Mindt, Raleigh, N.C., and Warren J. Schmidt, Bloomfield, N.J., assignors to Westinghouse Electric Corporation, East Pittsburgh, Pa., a corporation of Pennsylvania Application May 10, 1955, Serial No. 507,194

2 Claims. (Cl. 324—138)

This invention relates to a compensating unit for induction-type instruments and has particular relation to a compensating unit for alternating current watthour meters which includes a device for compensating for temperature errors of the meter.

Watthour meters previously have been constructed having voltage and current electromagnets effective when energized to produce alternating voltage and current magnetic fluxes. In order to establish a predetermined phase displacement between the voltage and current fluxes, watthour meters ordinarily are provided with an electroconductive member positioned in the path of one or both of the magnetic fluxes to lag the desired flux. The lagging member is ordinarily rendered adjustable for the purpose of obtaining a desired phase relationship between the fluxes.

Such lagging members are generally adjusted to provide a predetermined phase relationship between the voltage and current fluxes at a given temperature condition for a predetermined power factor of an associated circuit. It is desirable, however, that the proper phase relationship be maintained over a substantial range of operating temperatures of the meter.

In accordance with the invention, a compensating unit for a watthour meter is provided which includes a magnetic device of one-part construction effective to compensate for errors in registration of the meter which are caused by variations in temperature and which are dependent upon the power factor of an associated energizing circuit.

According to a preferred embodiment of the invention, the compensating unit includes an electroconductive lag member in the form of a closed circuit loop secured to the current electromagnet to intercept the voltage magnetic flux to lag the voltage flux. In order to provide compensation for temperature errors of the meter, a magnetic circuit device of one-part construction surrounds a portion of the electroconductive loop to provide a closed magnetic loop.

The magnetic circuit device comprises a deformable strip constructed substantially entirely of a material having a negative temperature coefficient of magnetic permeability. The strip is conveniently wrapped about a portion of the electroconductive loop to provide a closed magnetic circuit for magnetic flux produced by current flowing about the electroconductive loop.

According to one embodiment of the invention, the magnetic strip is wrapped about a portion of the electroconductive loop with the strip end portions in engagement to provide a single turn closed magnetic loop. The end portions may be secured together in any suitable manner, such as by a welding operation.

According to a further embodiment of the invention, the magnetic strip is wrapped upon itself about a portion of the electroconductive loop with portions of opposing surfaces of the strip in engagement to provide a multiturn closed magnetic loop. With this arrangement, the magnetic loop is effectively closed without the necessity of securing the free end of the strip to another portion of the strip.

It is, therefore, an object of the invention to provide an improved compensating unit for an alternating current watthour meter.

It is another object of the invention to provide a compensating unit for a watthour meter including improved means for compensating for temperature errors of the meter.

It is a further object of the invention to provide a compensating unit for a watthour meter including an electroconductive flux lagging loop and a single magnetic strip formed substantially entirely of a material having a negative temperature coefficient of magnetic permeability wrapped about a portion of the electroconductive loop.

Other objects of the invention will be apparent from the following detailed description taken in conjunction with the accompanying drawings, in which.

Figure 1:
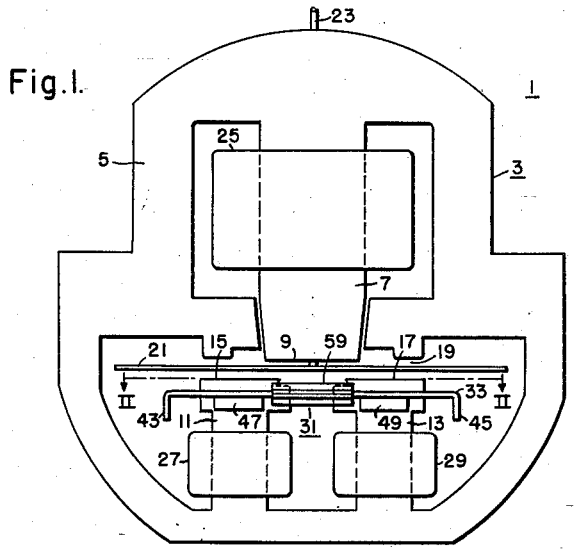
Figure 1 is a view in front elevation of a watthour meter embodying the invention.

Referring to the drawings, there is illustrated in Fig. 1 an electrical instrument in the form of an alternating current watthour meter represented generally by the numeral 1. The meter 1 includes a magnetic structure 3 which is formed of a plurality of magnetic laminations 5 each having the configuration illustrated in Fig. 1. The laminations 5 may be formed of any suitable material such as a high silicon steel.

The structure 3 includes a voltage magnetic pole 7 having a pole face 9 and a pair of spaced current magnetic poles 11 and 13 having respectively pole faces 15 and 17. By inspection of Fig. 1, it will be observed that the pole faces 15 and 17 are disposed substantially in a common plane which is spaced from and parallel to the plane of the pole face 9 to define an air gap 19. An electroconductive armature in the form of a disc 21 is mounted for rotation through the air gap 19 by means of a shaft 23.

In order to establish a shifting magnetic field in the air gap 19 for influencing the disc 21, the voltage magnetic pole 7 is surrounded by a voltage winding 25 and the current magnetic poles 11 and 13 are surrounded respectively by current windings 27 and 29. The current windings 27 and 29 are connected in series circuit relation and are oppositely poled relative to each other.

Energization of the winding 25 from a source of alternating voltage is effective to produce an alternating voltage flux which combines with alternating current flux produced by energization of the windings 27 and 29 from a source of alternating current to establish a shifting magnetic field in the air gap 19 for influencing the disc 21. As thus far specifically described, the meter 1 is similar in all respects to the meter disclosed in U.S. Patent No. 2,512,345, issued to R. M. Leippe.

When the windings 25, 27 and 29 are energized, it is desirable that the magnetic fluxes produced thereby which traverse the air gap 19 have a predetermined phase relationship. This phase relationship should be such that at unity power factor of an associated energizing circuit, the two magnetic fluxes are in quadrature. For the purpose of lagging the voltage flux substantially behind the current flux, the winding 25 is ordinarily provided with a large number of turns and the structure 3 provides a substantially closed magnetic circuit for the winding for producing substantial inductance. However, since the winding 25 is normally formed of an electroconductive material, such as copper, a certain amount of resistance is present in the winding 25 which prevents the establishment of the desired quadrature relationship between the voltage and current fluxes.

In accordance with the invention, a compensating unit represented generally by the numeral 31 is provided for the purpose of improving the performance of the meter 1. The unit 31 includes a lagging or quadrature member 33 for the purpose of lagging one or both of the magnetic fluxes to establish a predetermined phase relationship between the fluxes.

According to a preferred embodiment of the invention the member 33 is secured to the current magnetic poles 11 and 13 in the path of the voltage flux to lag the voltage flux. Such location of the member 33 is desirable in that it permits the provision of an air gap 19 of minimum length and prevents the induction of voltage in the member 33 by action of the alternating current flux. Furthermore, it has been observed that the member 33 exhibits greater reactance when positioned to surround the current poles 11 and 13 than if positioned to surround the voltage pole 7 which is highly advantageous in the present invention.

With such positioning the member 33 links a portion of the voltage flux which induces a voltage in the member 33 effective to cause current to flow through the member 33. This current creates a magnetic flux which combines with the voltage flux to thereby produce a resultant flux which has the desired phase relationship relative to the current flux.

Figure 2:
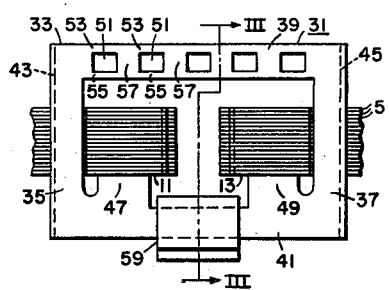
Fig. 2 is a view taken along the line II—II of Fig. 1.

The lag member 33 may be of any suitable construction. As illustrated in Fig. 2, the member 33 is in the form of a hollow rectangle which is constructed of a suitable electroconductive material such as copper. The member 33 has opposing first sides 35 and 37 and opposing second sides 39 and 41 of greater length dimensions than the sides 35 and 37. Suitable flanges 43 and 45 are bent down from the sides 35 and 37, respectively, to provide the member 33 with mechanical rigidity. The member 33 is conveniently secured to the current poles 11 and 13 by means of lugs 47 and 49 which are struck down from the side 41 to engage front surfaces of the current poles 11 and 13. Suitable rivets (not shown) may be passed through the lugs 47 and 49 and the poles 11 and 13 to secure the member 33 in position.

In order to permit variation of the lag effect produced by the member 33, the member 33 is preferably adapted for adjustment. To this end, the member 33 is conveniently constructed in the manner described in application Serial No. 419,972, filed by A. J. Petzinger on March 31, 1954, and assigned to the Westinghouse Electric Corporation.

According to such construction, a plurality of openings 51 are spaced along the side 39 of the member 33 to define a plurality of spaced portions 53 and 55 of the member 33 which are connected in series circuit relation. The portions 53 and 55 define a pair of parallel current paths which are connected at spaced points by integral bridges 57. By severing one or the other of the current paths at selected points intermediate the bridges 57 the effective cross-sectional area and length of the path presented to current may be varied to thereby vary the electrical resistance of the member 33.

By means of the member 33 a predetermined phase relationship between the voltage and the current fluxes may be obtained at a given power factor of an associated energizing circuit for a certain temperature condition. It is desirable, however, that the phase relationship between the fluxes for a given power factor be maintained over a substantial range of temperatures. In order to provide compensation for temperature variations for the member 33, the compensating unit 31 further includes a temperature compensating device 59.

In accordance with the invention, the device 59 is of one-part construction comprising a member preferably in the form of a strip of deformable magnetic material. The strip is positioned to surround a portion of the lag member 33 to provide a closed magnetic loop for magnetic flux produced by current flowing about the member 33. In order to provide an effective compensation for temperature variations, the strip is formed substantially entirely of a material having a negative temperature coefficient of magnetic permeability. Preferably, the strip is formed of a suitable nickel-iron alloy which exhibits such magnetic properties. With such construction the device 59 is effective to provide reactance which decreases in magnitude with increasing temperature to thereby maintain the desired phase relationship between the fluxes over a wide range of temperatures.

As previously mentioned the member 33 is preferably positioned to surround the current poles 11 and 13 wherein it exhibits greater reactance than when positioned to surround the voltage pole 7. Consequently, the reactance required by the device 59 to produce a desired compensating effect is considerably less with the member 33 surrounding the current poles 11 and 13 than with the member 33 surrounding the pole 9. It has been observed that substantial compensation may be provided by forming the device 59 of a single strip of the desired material positioned to link the member 33.

Figure 3:
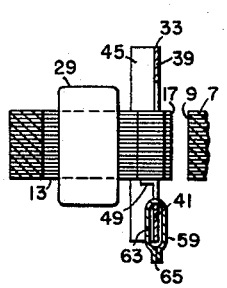
Fig. 3 is a view taken along the line III—III of Fig. 2.

The device 59 may be applied to the member 33 in any suitable manner. Preferably, the device 59 is positioned to surround the side 41 of the member 33 as best shown in Figs. 2 and 3. Conveniently, a flat strip of the desired magnetic material is wrapped about the side 41 from a first configuration wherein portions of the strip are in spaced relation to a second configuration wherein such portions are in engagement to provide a closed magnetic loop. Any suitable tools may be employed to effect the deformation of the strip about the side 41 of the member 33.

In the specific embodiment of Figs. 2 and 3, the device 59 is in the form of a flat strip wrapped about the side 41 to provide a single turn loop. The free ends of the strip may then be secured to each other to provide a closed loop. The strip has a pair of surfaces which are spaced by the thickness dimension of the strip. The inner one of these surfaces as viewed in Fig. 3 is represented by the numeral 63. As illustrated in Fig. 3, spaced portions of the surface 63 of the strip are in engagement and may be secured together as by a welding operation effected along the line of engagement of the spaced surface portions as indicated at 65.

Figure 4:
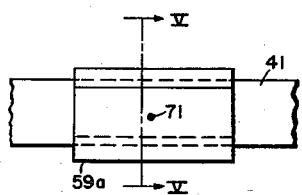
Fig. 4 is an enlarged view of a part of the meter of Fig. 1 showing a further embodiment of the invention.
Figure 5:
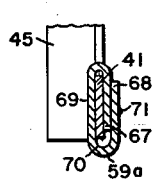
Fig. 5 is a view taken along the line V—V of Fig. 4.

Referring to Figs. 4 and 5, there is illustrated a different embodiment of the invention. As there shown, a compensating device 59a is provided in the form of a strip constructed substantially entirely of a material having a negative temperature coefficient of magnetic permeability. The strip is proportioned for wrapping about the side 41 of the member 33 with the strip end portions 67 and 68 in overlapping relation to provide a single turn loop as best shown in Fig. 5. Portions of opposing surfaces 69 and 70 of the strip are in engagement to provide a closed loop. Conveniently, the end 68 of the strip is secured to the end 67 as by a spot welding operation as indicated by the weld spot 71 in Fig. 4.

Figure 7:
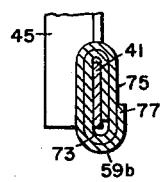
Fig. 7 is a view taken along the line VII—VII of Fig. 6.
Figure 6:
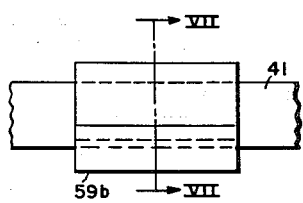
Fig. 6 is a view similar to Fig. 4 showing another embodiment of the invention.

A further embodiment of the invention is illustrated in Figs. 6 and 7. As there shown a device 59b is provided in the form of a strip constructed substantially entirely of material exhibiting a negative temperature coefficient of permeability. The strip is proportioned for wrapping about the side 41 of the member 33 to provide a multi-turn magnetic loop. As best shown in Fig. 7, the strip is wound upon itself with portions of opposing surfaces 73 and 75 of the strip in engagement to provide a closed magnetic loop having two full turns. With this construction the surfaces 73 and 75 are in engagement over a sufficiently large area so that securement of the end portion 77 of the strip to the surface 75 is not necessary to assure an effectively closed magnetic loop.

Although the invention has been described with reference to certain specific embodiments thereof, numerous embodiments of the invention are possible, and it is desired to cover all embodiments falling within the spirit and scope of the invention.

We claim as our invention:

1. A flux lagging unit for an induction instrument comprising an electroconductive member disposed in the form of a closed first loop, and an integral magnetic strip formed substantially entirely of a material having a negative temperature coefficient of magnetic permeability, said strip having a pair of ends and having a pair of surfaces spaced by the thickness dimension of the strip, said thickness dimension being substantially uniform throughout the length of the strip, said strip being disposed in the form of a closed second loop having a single turn surrounding a portion of the first loop with a portion of one of said surfaces engaging a portion of the other of said surfaces along a plane, said ends being positioned in overlapping relation on a common side of said electroconductive member, said surfaces being welded together in a direction transverse to said plane.

2. In a watthour meter, a magnetic structure including a voltage magnetic pole and a pair of spaced current magnetic poles, winding means for the voltage and current poles effective when energized for producing alternating voltage and current fluxes, and a flux lagging unit comprising an electroconductive member disposed in the form of a closed first loop surrounding said current poles in the path of the voltage flux, and an integral magnetic strip member having a pair of end portions and having a pair of surfaces spaced by the thickness dimension of the strip member, said thickness dimension being substantially uniform throughout the length of the strip member, said magnetic member being disposed in the form of a closed second loop having a single turn surrounding a portion of said first loop with a portion of one of said surfaces engaging a portion of the other of said surfaces along a plane, said end portions being positioned in overlapping relation on a common side of said electroconductive member, said surfaces being welded together in a direction transverse to said plane, said magnetic member being formed substantially entirely of a material having a negative temperature coefficient of magnetic permeability.

References Cited in the file of this patent

UNITED STATES PATENTS

| | | |
|---|---|---|
| 2,050,881 | Faus | Aug. 11, 1936 |
| 2,146,606 | Trekell | Feb. 7, 1939 |
| 2,321,437 | Trekell | June 8, 1943 |
| 2,328,728 | Leippe | Sept. 7, 1943 |
| 2,336,834 | Bakke | Dec. 14, 1943 |